(12) United States Patent
Pusala et al.

(10) Patent No.: US 11,795,031 B2
(45) Date of Patent: Oct. 24, 2023

(54) SYSTEM AND METHOD FOR SERVICING REMOTE ELEVATOR CALLS BASED ON PROXIMITY TO ELEVATOR LANDING

(71) Applicant: Otis Elevator Company, Farmington, CT (US)

(72) Inventors: Rajinikanth Pusala, Telangana (IN); Naveen Kumar Yeddi, Telangana (IN)

(73) Assignee: OTIS ELEVATOR COMPANY, Farmington, CT (US)

( * ) Notice: Subject to any disclaimer, the term of this patent is extended or adjusted under 35 U.S.C. 154(b) by 875 days.

(21) Appl. No.: 16/564,810

(22) Filed: Sep. 9, 2019

(65) Prior Publication Data
US 2020/0087109 A1 Mar. 19, 2020

(30) Foreign Application Priority Data
Sep. 14, 2018 (IN) .............................. 201811034753

(51) Int. Cl.
*B66B 1/46* (2006.01)
*B66B 1/28* (2006.01)
*B66B 1/34* (2006.01)
*H04W 4/029* (2018.01)
*H04W 4/80* (2018.01)
(Continued)

(52) U.S. Cl.
CPC ............... *B66B 1/468* (2013.01); *B66B 1/28* (2013.01); *B66B 1/3461* (2013.01); *H04M 1/72409* (2021.01); *H04W 4/021* (2013.01); *H04W 4/029* (2018.02); *H04W 4/80* (2018.02); *B66B 2201/101* (2013.01); *B66B 2201/4638* (2013.01); *B66B 2201/4653* (2013.01)

(58) Field of Classification Search
CPC ................................................... B66B 1/3461
See application file for complete search history.

(56) References Cited

U.S. PATENT DOCUMENTS

| 6,397,976 B1 | 6/2002 | Hale et al. |
| 6,603,977 B1 | 8/2003 | Walsh et al. |
| 7,500,544 B2 | 3/2009 | Hakala et al. |
| (Continued) | | |

FOREIGN PATENT DOCUMENTS

| CN | 104261213 A | 1/2015 |
| CN | 104276462 A | 1/2015 |
| (Continued) | | |

OTHER PUBLICATIONS

European Search Report for European Application No. 19196956.7 dated Feb. 3, 2020, 8 pages.
(Continued)

*Primary Examiner* — Wen W Huang
(74) *Attorney, Agent, or Firm* — CANTOR COLBURN LLP

(57) ABSTRACT

Disclosed is an elevator system having an elevator, the elevator having an elevator landing and an elevator controller, the controller capable of communicating over a network with a device, and the device may be located within an area positionally associated with the landing, the controller: receives from the device, a request for elevator service at the landing, effects monitoring the device relative to the area, effects a first response upon determining that the device is inside the area, otherwise effects a second response.

6 Claims, 3 Drawing Sheets

(51) Int. Cl.
*H04W 4/021* (2018.01)
*H04M 1/72409* (2021.01)

(56) References Cited

U.S. PATENT DOCUMENTS

| | | | |
|---|---|---|---|
| 7,717,238 | B2 | 5/2010 | Hamaji et al. |
| 9,323,232 | B2 | 4/2016 | Blom |
| 9,365,393 | B2 | 6/2016 | Salmikuukka et al. |
| 9,521,519 | B2 | 12/2016 | Chiou et al. |
| 9,878,875 | B1 | 1/2018 | Scoville et al. |
| 9,896,305 | B2 | 2/2018 | Blandin et al. |
| 1,001,735 | A1 | 7/2018 | Bergman et al. |
| 2008/0200183 | A1* | 8/2008 | Voyer .............. B66B 1/3461 455/414.1 |
| 2013/0048436 | A1* | 2/2013 | Chan ............... B66B 1/2408 187/387 |
| 2015/0198447 | A1* | 7/2015 | Chen ................ G01C 21/206 701/472 |
| 2016/0031675 | A1* | 2/2016 | Silvennoinen ........ B66B 1/468 700/275 |
| 2016/0031676 | A1* | 2/2016 | Haipus ............... B66B 1/468 187/382 |
| 2016/0122157 | A1 | 5/2016 | Keser |
| 2016/0130113 | A1* | 5/2016 | Tokura ................ B66B 1/468 187/382 |
| 2017/0122744 | A1 | 5/2017 | Long et al. |
| 2017/0134894 | A1 | 5/2017 | Simcik |
| 2017/0349402 | A1 | 12/2017 | Chapman et al. |
| 2018/0118509 | A1* | 5/2018 | Simcik ................ B66B 1/468 |
| 2018/0118512 | A1 | 5/2018 | Baldi et al. |
| 2018/0201474 | A1* | 7/2018 | Noxon ................. H04W 8/005 |
| 2018/0370760 | A1* | 12/2018 | Huang ................ B66B 1/3461 |
| 2019/0112149 | A1* | 4/2019 | Wedzikowski ........ B66B 3/006 |
| 2019/0127178 | A1* | 5/2019 | Tsuji .................... B66B 1/18 |
| 2019/0308844 | A1* | 10/2019 | Kannan .................. B66B 1/28 |

FOREIGN PATENT DOCUMENTS

| | | |
|---|---|---|
| CN | 104968592 A | 10/2015 |
| CN | 105540361 A | 5/2016 |
| CN | 106335822 A | 1/2017 |
| CN | 107902503 A | 4/2018 |
| CN | 108163652 A | 6/2018 |
| EP | 0189830 A2 | 8/1986 |
| EP | 1924519 B1 | 11/2017 |
| JP | H09278301 A | 10/1997 |
| JP | 2003226473 A | 8/2003 |
| JP | 2010089953 A | 4/2010 |
| JP | 2011136836 A | 7/2011 |
| JP | 2013112515 A | 6/2013 |
| WO | 02066357 A1 | 8/2002 |
| WO | 2017112659 A1 | 6/2017 |
| WO | 2017175021 A1 | 10/2017 |

OTHER PUBLICATIONS

Chinese Office Action Issued in Chinese Application No. 201910863586.7 dated Jul. 1, 2021; 9 Pages.

* cited by examiner

SYSTEM AND METHOD FOR SERVICING REMOTE ELEVATOR CALLS BASED ON PROXIMITY TO ELEVATOR LANDING

CROSS-REFERENCE TO RELATED APPLICATIONS

This application claims the benefit of India Application No. 201811034753 filed Sep. 14, 2018, the disclosure of which is incorporated herein by reference in its entirety.

BACKGROUND

The embodiments herein relate to elevators and more specifically to a system and method for servicing remote elevator calls based on proximity to an elevator landing.

Elevator users may be able to request elevator calls remotely. Users may be unable to utilize the requested service after the request because of various reasons. Serving the elevator based on such request is inefficient because it may waste power and create undue delays for other passengers.

SUMMARY

Disclosed is an elevator system comprising an elevator having an elevator landing and an elevator controller, the controller capable of communicating over a network with a device, and the device may be located within an area positionally associated with the landing, the controller: receives from the device, a request for elevator service at the landing, effects monitoring the device relative to the area, effects a first response upon determining that the device is inside the area, otherwise effects a second response. Further disclosed is a method of servicing an elevator request with an elevator system, the system comprising an elevator having an elevator landing and an elevator controller, the controller capable of communicating over a network with a device, and the device may be located within an area positionally associated with the landing, the method comprising the controller: receiving from the device, a request for elevator service at the landing, effecting monitoring the device relative to the area, effecting a first response upon determining that the device is inside the area, otherwise effecting a second response.

In addition to one or more of the above disclosed features or as an alternate the first response comprises the controller effecting a first elevator assignment for the elevator to service the request.

In addition to one or more of the above disclosed features or as an alternate the second response comprises the controller discarding the request.

In addition to one or more of the above disclosed features or as an alternate after assigning the elevator to service the request, the controller continues to effect monitoring the device relative to the area, and effects a third response upon determining that (i) the device has left the area; and/or (ii) is leaving the area.

In addition to one or more of the above disclosed features or as an alternate the third response comprises discarding the request and terminating the first assignment.

In addition to one or more of the above disclosed features or as an alternate monitoring the device comprises the controller receiving from the first device Global Positioning System (GPS) data.

In addition to one or more of the above disclosed features or as an alternate the controller effects from the GPS data a dead reckoning of the device to determine whether the device is leaving the area.

In addition to one or more of the above disclosed features or as an alternate the device includes a display screen and the first response comprises the controller transmitting first data for display on the display screen, the first data identifying that pursuant to the first elevator assignment the first elevator is assigned to service the request.

In addition to one or more of the above disclosed features or as an alternate the third response comprises the controller transmitting second data for display on the display screen, the second data indicating that the first elevator assignment is terminated.

In addition to one or more of the above disclosed features or as an alternate the controller communicates with the device over a personal area network.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
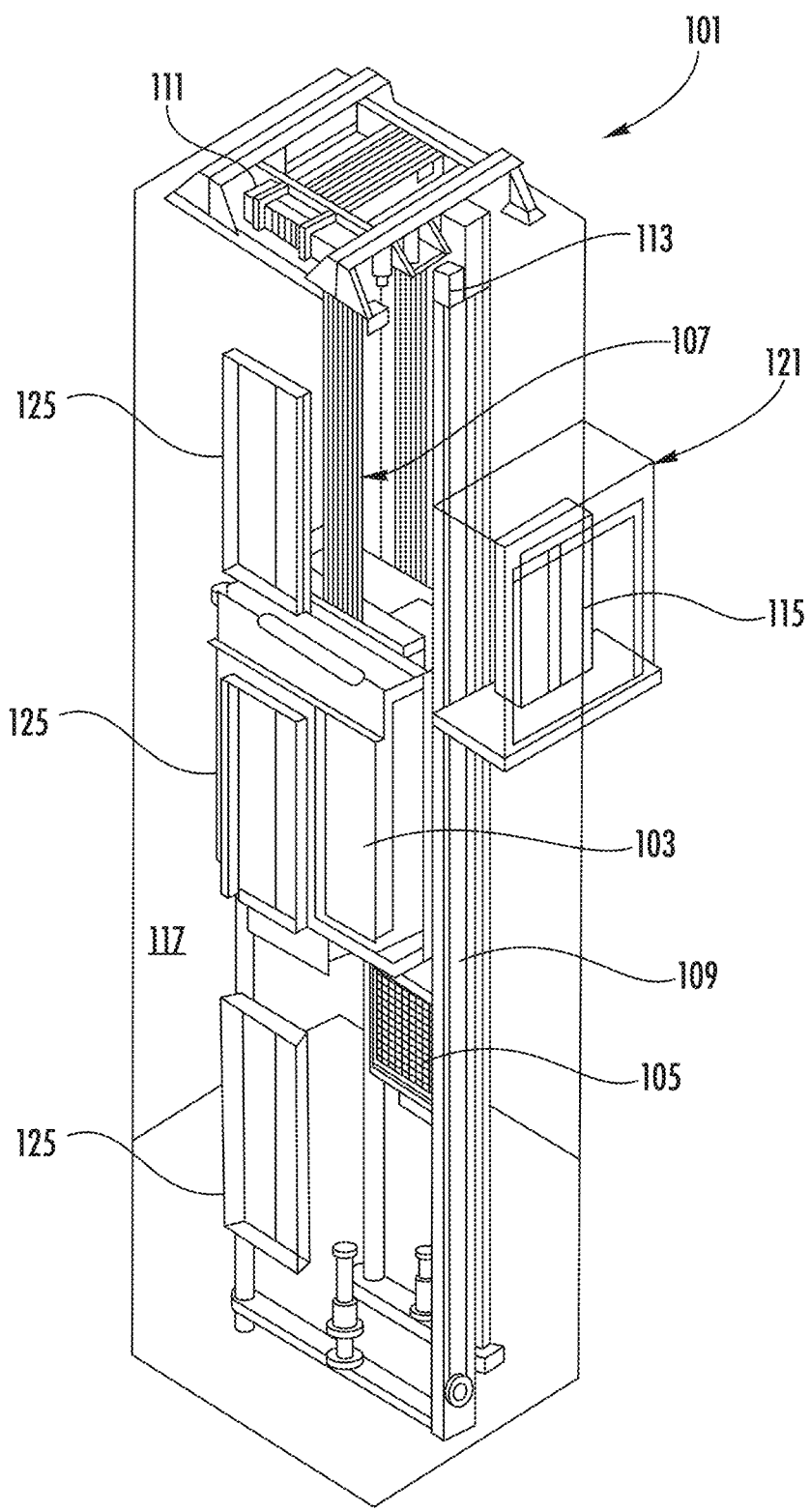
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator hoistway 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator hoistway 117, such as on a support or guide rail, and may be configured to provide position signals related to a position of the elevator car 103 within the elevator hoistway 117. In other embodiments, the position reference system 113 may be directly mounted to a moving component of the machine 111, or may be located in other positions and/or configurations as known in the art.

The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator hoistway 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator hoistway 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator hoistway 117.

Although shown and described with a roping system including tension member 107, elevator systems that employ other methods and mechanisms of moving an elevator car within an elevator hoistway may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

Figure 2:
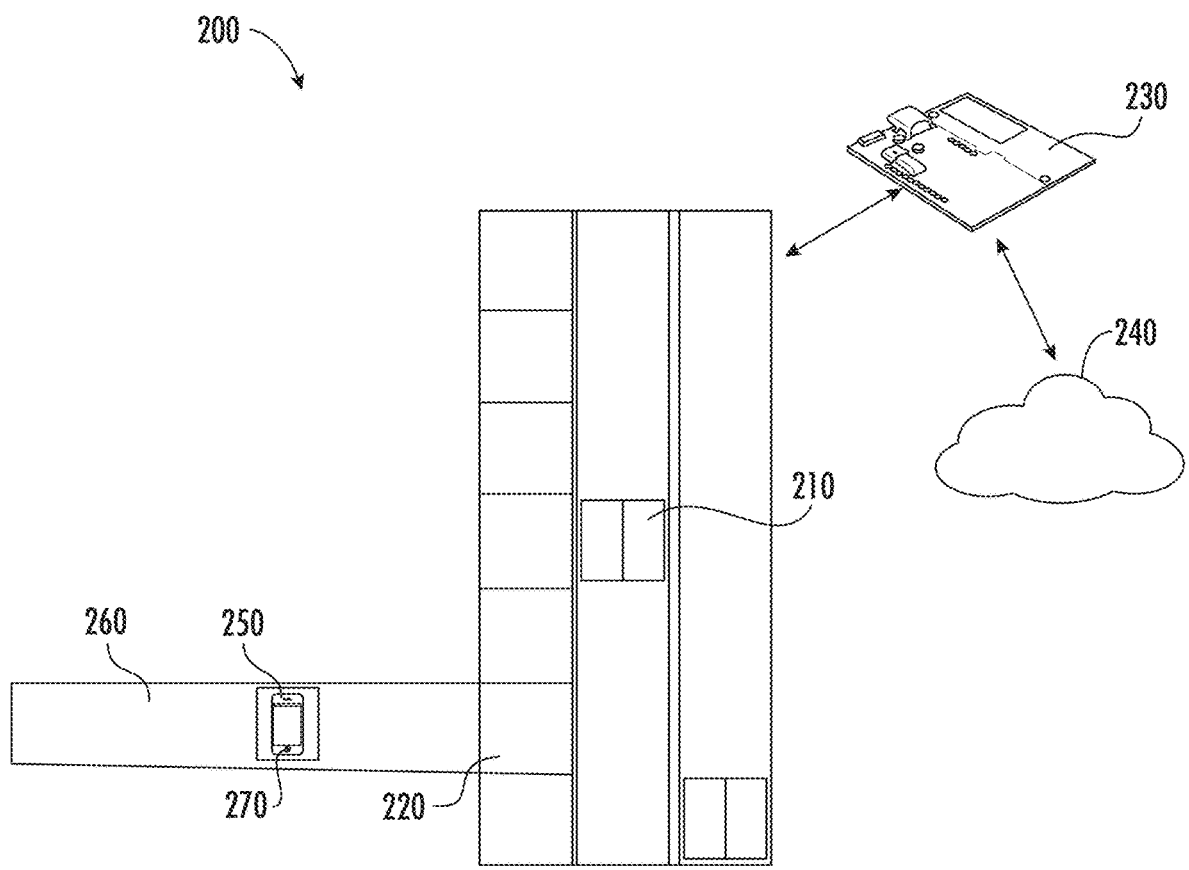
FIG. 2 illustrates additional features associates with one or more disclosed embodiments.

Turning to FIG. 2, illustrated is an elevator system generally referred to as 200. The system 200 may include an elevator 210 having an elevator landing 220 and an elevator controller 230. The controller 230 may be capable of communicating over a network 240 with a device 250. The device 250 may be a mobile phone utilized by a person seeking elevator service. The device 250 may be located within an area 260 positionally associated with the landing 220. For example in a hotel the area 260 may be located between the landing 220 and a door to a room from which the person is making the service request.

Figure 3:
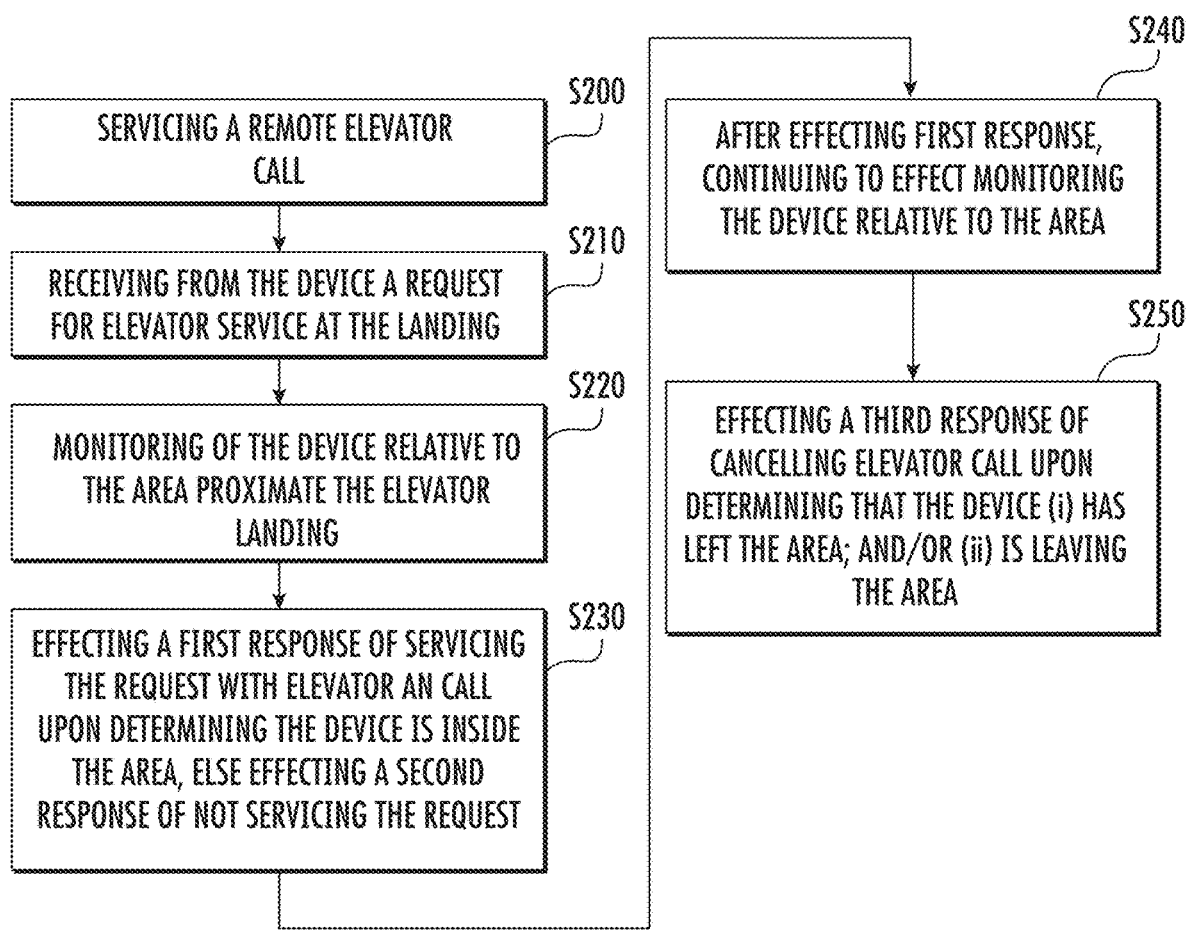
FIG. 3 illustrates a process associated with one or more disclosed embodiments.

Turning to FIG. 3, illustrated is a first process S200 of servicing a remote elevator call, wherein the controller 230 performs step S210 of receiving from the device 250, a request for elevator service at the landing 220. At step S220 the controller 230 mat effect monitoring of the device 250 relative to the area 260 proximate the elevator landing 220. At step S230 the controller 230 may effect a first response upon determining the device 250 is inside the area 260, otherwise the controller 230 may effect a second response.

According to an embodiment the first response may comprise the controller 230 effecting a first elevator assignment, that is, an elevator call, in order for the elevator 210 to service the request. The second response may comprise the controller 230 discarding the request.

According to an embodiment after assigning the elevator 210 to service the request, the controller 230 may perform step S240 of continuing to effect monitoring the device 250 relative to the area 260. At step S250 the controller 230 may effect a third response upon determining that the device 250 (i) has left the area 260; and/or (ii) is leaving the area 260. According to an embodiment the third response may comprise the controller 230 discarding the request and terminating the first assignment, that is, cancelling the elevator call. From this, the elevator 210 may bypass the lobby 220 if no other calls to the lobby 220 are placed.

According to an embodiment, the controller 230 may monitor the device 250 by receiving global positioning (GPS) data from the first device 250. According to an embodiment the controller 230 may effect a dead reckoning of the device 250 from the GPS data while monitoring whether the device 250 is leaving the area 260.

According to an embodiment the device 250 may include a display screen 270 and the first response mat further comprise the controller 230 transmitting first data for display on the display screen 270. The first data may identify that pursuant to the first elevator assignment the first elevator 210 is assigned to service the request. According to an embodiment the third response may further comprise the controller 230 transmitting second data for display on the display screen 270. The second data may indicate that the first elevator assignment is terminated. According to an embodiment the controller 230 may communicate with the device 250 over a personal area network.

According to the above disclosure, upon a user making a remote elevator call, a system may register the call, assign responsive elevator information to the user, and monitors an area around the elevator to determine whether the user is within the area. If the user is not within the area and/or does not enter the area, the system may cancel the call request. If the user is within the area and/or enters the area, the request may be served. To track the user, the system may utilize, for example, a GPS service available to the user.

The above disclosure provides an elevator system that may reduce power consumption by cancelling elevator calls that are will be unutilized by the user making the call. The system may reduce travel time of elevator passengers utilizing the elevator and reduce a wait time for passengers waiting at elevator lobbies, for example, on other floors.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An elevator system comprising:
    an elevator having an elevator landing and an elevator controller, the controller capable of communicating over a network with a device held and operated by a user, and the device configured for being moved into and out of a first area positionally associated with the landing,
    the controller:
        receives from the device, a request for elevator service at the landing upon a user making a remote elevator call when the device is outside the first area,
        effects monitoring the device relative to the first area to determine whether the device is within the first area, wherein the monitoring the device comprises the controller receiving, from the device, Global Positioning System (GPS) data to track the device,
        effects a first response upon determining that the device is inside the first area, wherein the first response comprises the controller effecting a first elevator assignment for the elevator to service the request, otherwise effects a second response, wherein the second response comprises the controller discarding the request, and
        wherein the device includes a display screen and the first response comprises the controller transmitting first data for display on the display screen, the first data identifying that pursuant to the first elevator assignment the first elevator is assigned to service the request,
    wherein after assigning the elevator to service the request, the controller:
        continues to effect monitoring the device relative to the first area, to effect from the GPS data a dead reckoning of the device to determine whether the device is leaving the first area, and
        effects a third response while the device is in the first area upon determining, that the device is leaving the first area,
        wherein the third response comprises discarding the request and terminating the first assignment, and
        wherein the third response comprises the controller transmitting second data for display on the display screen, the second data indicating that the first elevator assignment is terminated.

2. The system of claim 1 wherein after assigning the elevator to service the request, the controller effects the third response upon determining that the device has left the first area.

3. The system of claim 1 wherein the controller communicates with the device over a personal area network.

4. A method of servicing an elevator request with an elevator system,
    the system comprising an elevator having an elevator landing and an elevator controller, the controller capable of communicating over a network with a device held and operated by a user, and the device configured for being moved into and out of a first area positionally associated with the landing,
    the method comprising the controller:
        receiving from the device, a request for elevator service at the landing upon the device making a remote elevator call when the device is outside the first area,
        effecting monitoring the device relative to the first area to determine whether the device is within the first area, wherein monitoring the device comprises the controller receiving, from the device, Global Positioning System (GPS) data to track the device,
        effecting a first response upon determining that the device is inside the first area, wherein the first response comprises the controller effecting a first elevator assignment for the elevator to service the request, otherwise effecting a second response, wherein the second response comprises the controller discarding the request, and
        wherein the device includes a display screen and the first response comprises the controller transmitting first data for display on the display screen, the first data identifying that pursuant to the first elevator assignment the first elevator is assigned to service the request;
    wherein after assigning the elevator to service the request, the controller:
        continues to effect monitoring the device relative to the first area, to effect from the GPS data a dead reckoning of the device to determine whether the device is leaving the first area; and
        effects a third response while the device is in the first area upon determining that the device is leaving the first area,
        wherein the third response comprises discarding the request and terminating the first assignment, and
        wherein the third response comprises the controller transmitting second data for display on the display screen, the second data indicating that the first elevator assignment is terminated.

5. The method of claim 4 wherein after assigning the elevator to service the request, the controller effects the third response upon determining that (i) the device has left the first area.

6. The method of claim 4 wherein the controller communicates with the device over a personal area network.

\* \* \* \* \*